United States Patent
Sofia et al.

(10) Patent No.: US 10,621,381 B2
(45) Date of Patent: *Apr. 14, 2020

(54) EVENT LOG TAMPER DETECTION

(71) Applicant: INTERNATIONAL BUSINESS MACHINES CORPORATION, Armonk, NY (US)

(72) Inventors: Anthony T. Sofia, Highland, NY (US); Peter G. Sutton, Lagrangeville, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/807,924

(22) Filed: Nov. 9, 2017

(65) Prior Publication Data

US 2018/0075257 A1 Mar. 15, 2018

Related U.S. Application Data

(63) Continuation of application No. 14/876,953, filed on Oct. 7, 2015, now Pat. No. 10,089,497, which is a continuation of application No. 14/809,464, filed on Jul. 27, 2015, now Pat. No. 9,864,878.

(51) Int. Cl.
| | |
|---|---|
| *G06F 21/64* | (2013.01) |
| *H04L 29/06* | (2006.01) |
| *G06F 21/86* | (2013.01) |
| *G06F 21/88* | (2013.01) |

(52) U.S. Cl.
CPC .......... *G06F 21/64* (2013.01); *G06F 21/86* (2013.01); *G06F 21/88* (2013.01); *H04L 63/1416* (2013.01); *G06F 2221/2101* (2013.01)

(58) Field of Classification Search
CPC ..... H04L 63/1416; G06F 21/64; G06F 21/71; G06F 21/88; G06F 63/6218; G06F 2221/2101
See application file for complete search history.

(56) References Cited

U.S. PATENT DOCUMENTS

| | | | | |
|---|---|---|---|---|
| 6,347,374 B1 * | 2/2002 | Drake | ............... | G06F 21/554 709/224 |
| 7,073,071 B1 * | 7/2006 | Ellison | ............... | H04L 9/3236 713/193 |
| 7,644,290 B2 * | 1/2010 | Ransom | ............... | G01R 22/066 713/194 |

(Continued)

OTHER PUBLICATIONS

Anthony T. Sofia et al., "Event Log Tamper Detection", U.S. Appl. No. 14/809,464, filed Jul. 27, 2015.

(Continued)

*Primary Examiner* — Oleg Korsak
*Assistant Examiner* — Feliciano S Mejia
(74) *Attorney, Agent, or Firm* — Cantor Colburn LLP; William Kinnaman

(57) ABSTRACT

Embodiments are described for generating, by a processor, a first event record in response to an event being performed by a computer; and generating, by the processor, a second event record in response to the first event record being generated, wherein the second event record comprises a signature corresponding to the first event record.

20 Claims, 5 Drawing Sheets

(56) References Cited

U.S. PATENT DOCUMENTS

| | | | |
|---|---|---|---|
| 8,230,228 B2 * | 7/2012 | Hahn | G06F 21/64 |
| | | | 713/176 |
| 8,779,921 B1 | 7/2014 | Curtiss | |
| 8,970,393 B2 | 3/2015 | Benson et al. | |
| 9,613,038 B2 * | 4/2017 | Factor | G06F 16/125 |
| 10,015,015 B1 * | 7/2018 | Lazar | H04L 9/3247 |
| 2006/0224930 A1 * | 10/2006 | Bantz | G06F 11/0748 |
| | | | 714/48 |
| 2009/0319786 A1 | 12/2009 | Viscomi et al. | |
| 2015/0188715 A1 * | 7/2015 | Castellucci | G06F 16/1734 |
| | | | 713/178 |
| 2016/0171205 A1 * | 6/2016 | Bauer | G06F 21/44 |
| | | | 726/26 |

OTHER PUBLICATIONS

Anthony T. Sofia et al., "Event Log Tamper Detection", U.S. Appl. No. 14/876,953, filed Oct. 7, 2015.

List of IBM Patents or Patent Applications Treated as Related; (Appendix P), Filed Nov. 9, 2017; 2 pages.

* cited by examiner

EVENT LOG TAMPER DETECTION

DOMESTIC PRIORITY

This application is a continuation of and claims priority from U.S. patent application Ser. No. 14/876,953, filed on Oct. 7, 2015, entitled "EVENT LOG TAMPER DETECTION", which in turn claims priority from U.S. patent application Ser. No. 14/809,464, filed on Jul. 27, 2015, the entire contents of all of the applications listed above are incorporated herein by reference.

BACKGROUND

The present application relates to protecting records created by an event logger, and more specifically, to protecting records created by an existing event logger without affecting an event log processing infrastructure.

In systems such as a server, an event logger may record an event record corresponding to an event, such as a system event associated with an operation of the server. Enterprises may audit such logged event records as part of regulatory compliance. For compliance, the audit may have to verify that contents of the event record have remained unmodified or that any changes have been tracked.

SUMMARY

The examples described throughout the present application provide technical solutions to technical problems regarding tamper detection in existing event logging systems to facilitate an enterprise to preserve existing workflows and systems that use existing log data that contain the event records. The provided technical solutions improve functionality of the event logging systems.

An aspect includes a computer implemented method including generating, by a processor, a first event record in response to an event being performed by a computer and generating a second event record in response to the first event record being generated. The second event record includes a signature corresponding to the first event record. The second event record may include a spatial reference to the first event record and the signature identifies contents of the first event record. The second event record may further include an identifier of a type of the first event record.

The computer implemented method may further include generating, by the processor, a third event record of the same type as the type of the first event record. The second event record may include a signature corresponding to the third event record in response to the third event record being of the same type. In this case, the third event record is generated prior to the second event record, and after the first event record. The computer implemented method may further include receiving, by the processor, a request to copy event records of the type of the first event record and copying, by the processor, the first event record, the third event record, and the second event record in response to the request to copy the first event record. Alternatively, the method may include copying the first event record and the second event record in response to the request to copy the first event record.

The computer implemented method may further include maintaining, by the processor, the spatial reference between the first event record and the second event record by copying intermediate event records between the first event record and the second event record, in response to the request to copy the first event record.

The computer implemented method may further include receiving, by the processor, a request to detect tampering of the first event record; and in response, validating, by the processor, the first event record by comparing the first event record with the signature in the second event record.

Another aspect includes a system including a memory and a processor. The processor is operable to generate a first event record corresponding to an event performed by the system and generate a tamper detection data for the first event record. The processor may store the tamper detection data of the first event record in a second event record. The second event record may include a spatial reference of the first event record.

The processor may be further configured to receive an instruction to copy the first event record; and in response, copy the first event record and the second event record. Alternatively or in addition, the processor may be configured to receive an instruction to move the first event record; and in response, update the second event record to update the spatial reference of the first event record. Alternatively, the processor may be configured to receive an instruction to move the first event record; and in response, maintain a spatial relation between the first event record and the second event record by moving the second event record in conjunction with the first event record.

The processor may identify a type of the first event record. The system may also include identify the second event record as being associated with the type of the first event record, and include store the tamper detection data in the second event record in response to the second event record being associated with the type of the first event record.

In addition, the processor may receive an instruction to copy event records of the type of the first event record and in response, identify and copy the event records of the type of the first event record, and identify and copy the second event record that is associated with the type of the first event record. In an example, the processor may generate a third event record corresponding to another event performed by the system. The third event record may be of a different type than the first event record. The processor may generate a tamper detection data for the third event record. Additionally, the processor may receive an instruction to detect validity of the first event record and in response, compare contents of the first event record with the tamper detection data in the second event record. The tamper detection data may include a digital signature of the contents of the first event record.

Another aspect includes a computer program product including a non-transitory computer readable storage medium having program instructions embodied therewith, the program instructions being executable by a processor to cause the processor to perform a method. The method may include generating, by the processor, a metadata for a first event record. The metadata may include a signature of the first event record. The method may further include storing, by the processor, the metadata in a second event record. The computer program product also includes adding, by the processor, a spatial reference of the first event record to the second event record. The metadata may be based on a type of a system event corresponding to the first event record, and the metadata includes an identification of the type of the system event. The second event record may include a plurality of metadata for a plurality of event records corresponding to respective system events of the same type as the type of the system event of the first event record. The method may further include receiving, by the processor, an instruction to move the first event record, and in response, moving, by the processor, the second event record.

BRIEF DESCRIPTION OF THE DRAWINGS

The examples may be better understood with reference to the following figures and description. The components in the figures are not necessarily to scale. Moreover, in the figures, like-referenced numerals designate corresponding parts throughout the different views.

Additional features and advantages are realized through the techniques of the technical solutions, examples and aspects of which, are described in detail herein.

DETAILED DESCRIPTION

Techniques to enhance existing event logging systems by additional functionality of tamper detection while preserving existing workflows that use log data generated by the event logging systems are described. The examples described throughout the document facilitate tamper detection of the log data without modifying the log data generated. The tamper detection data generated for an event record is stored as another event record. To audit whether the event record has been tampered with, the contents of the event record may be compared with the other record. The other record may be bypassed during other operations. Accordingly, an existing event logging system may be improved to provide tamper detection for regulatory compliance without incurring costs to modify workflows that use the existing workflows.

Figure 1:
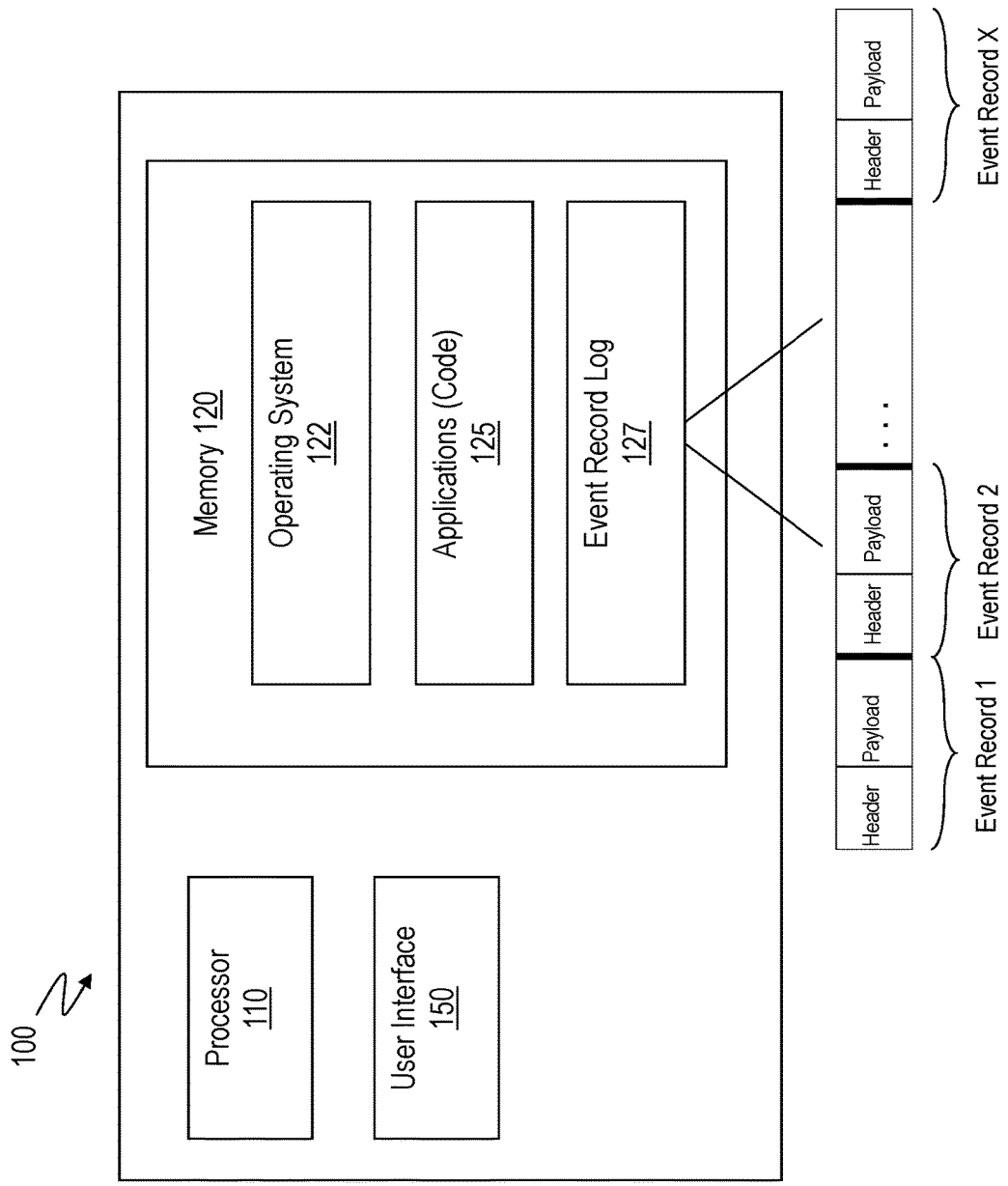
FIG. 1 illustrates an example system.

FIG. 1 illustrates an example system 100. The system 100 may be a computer such as a server computer or the like. The system 100 may include, among other components, a processor 110, a memory 120, a user interface 150, and a communication interface 170.

The processor 110 may be a central processor of the system 100 responsible for execution of an operating system, control instructions, and applications installed on the system 100. The processor 110 may be one or more devices operable to execute logic. The logic may include computer executable instructions or computer code embodied in the memory 120 or in other memory that when executed by the processor 110, cause the processor 110 to perform the features implemented by the logic. The computer code may include instructions executable with the processor 110. The computer code may include embedded logic. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code. The processor 110 may be a general processor, central processing unit, server, application specific integrated circuit (ASIC), digital signal processor, field programmable gate array (FPGA), digital circuit, analog circuit, or combinations thereof. The processor 110 may be in communication with the memory 120 and other components of the system 100. In one example, the processor 110 may also be in communication with additional elements, such as the user interface 150 and the communication interface 170.

The memory 120 may be non-transitory computer storage medium. The memory 120 may be DRAM, SRAM, Flash or any other type of memory or a combination thereof. The memory 120 may store an operating system 122 and applications 125 that are executable by the processor 110. The operating system 122 and the applications 125 may be stored on the memory 120 by the manufacturer, provider, or end-user of the system 100. The memory 120 may contain other data such as images, videos, documents, spreadsheets, audio files, and other data that may be associated with operation of the system 100. For example, the memory 120 may be used to store an event record log 127.

The user interface 150 may include a display, a speaker, a keyboard, a mouse, or any other component that facilitates user interaction. The display may be touch screen enabled. The user interface 150 may, alternatively, or in addition, a microphone or any other component that may facilitate user interaction. The user interface 150 may be circuitry, such as processor, memory, communication interfaces, integrated circuits, antennas, resistors, capacitors, and any other hardware components. The user interface 150 may also involve software. For example, the user interface 130 may include instructions and/or data that may be stored on memory. The instructions and/or data may control operations of the user interface 150. The instructions may be computer executable. The data may include parameters and/or preset conditions associated with the user interface 150.

The event record log 127 includes one or more event records 130a-130x. An event record is a data record describing an operation of the system 100. The operating system 122, using the processor 110, records the event record in response to the operation being initiated and/or completed. For example, the event may be a startup event of the system 100, a file creation event, a file copy event, a user login event, or any other event that the operating system 122 may detect. The operating system 122 may be configured to detect a predetermined type of events. For example, the operating system 122 may be configured to detect 'file' type events such as a file creation event, a file copy event, a file move event, a file deletion event, a file modification event, or any other file event. In addition or alternatively, the operating system 122 may be configured to detect 'user' type events such as a user login event, a user logout event, a user profile change event and other user events. Other event types are possible and above are just a few examples.

The event record is stored using a predetermined format. For example, the event record may include a header and a payload. The payload includes description of the corresponding event. For example, if the corresponding event is a file event, the payload includes a file identification, a file location, an indication of the operation performed, and other information describing the event. The header includes metadata that describes the payload, such as a length of the payload, a timestamp, or the like. The event record may be a file. Alternatively, the event record may be an entry within a file or a stream, such as a log stream.

The event record log 127 is used to validate operation of the system 100. For example, the operating system 122 may include a System Management Facilities (SMF). The SMF Enterprises may use the event record log 127 to show regulatory compliance. For example, to be compliant, the system 100 may have to perform operations in a predetermined manner. The SMF facilitates querying the event record log 127, such as via an Application Programming Interface (API), to ensure that the system 100 was complaint with the predetermined manner of operations. In this regard, the SMF or a system auditor operates according to the predetermined format of the event record. Hence, modifying the predetermined format may cause the system auditor and the SMF to cease from current operations.

Regulatory compliance may make it vital for the SMF to ensure that the event records in the event record log 127 have not been tampered with. Addition of such tamper detection record, as described in this document, may cause the SMF and system auditor to be modified, thus leading to additional costs. The examples described throughout the present document provide technical solutions to this technical problem.

Figure 2:
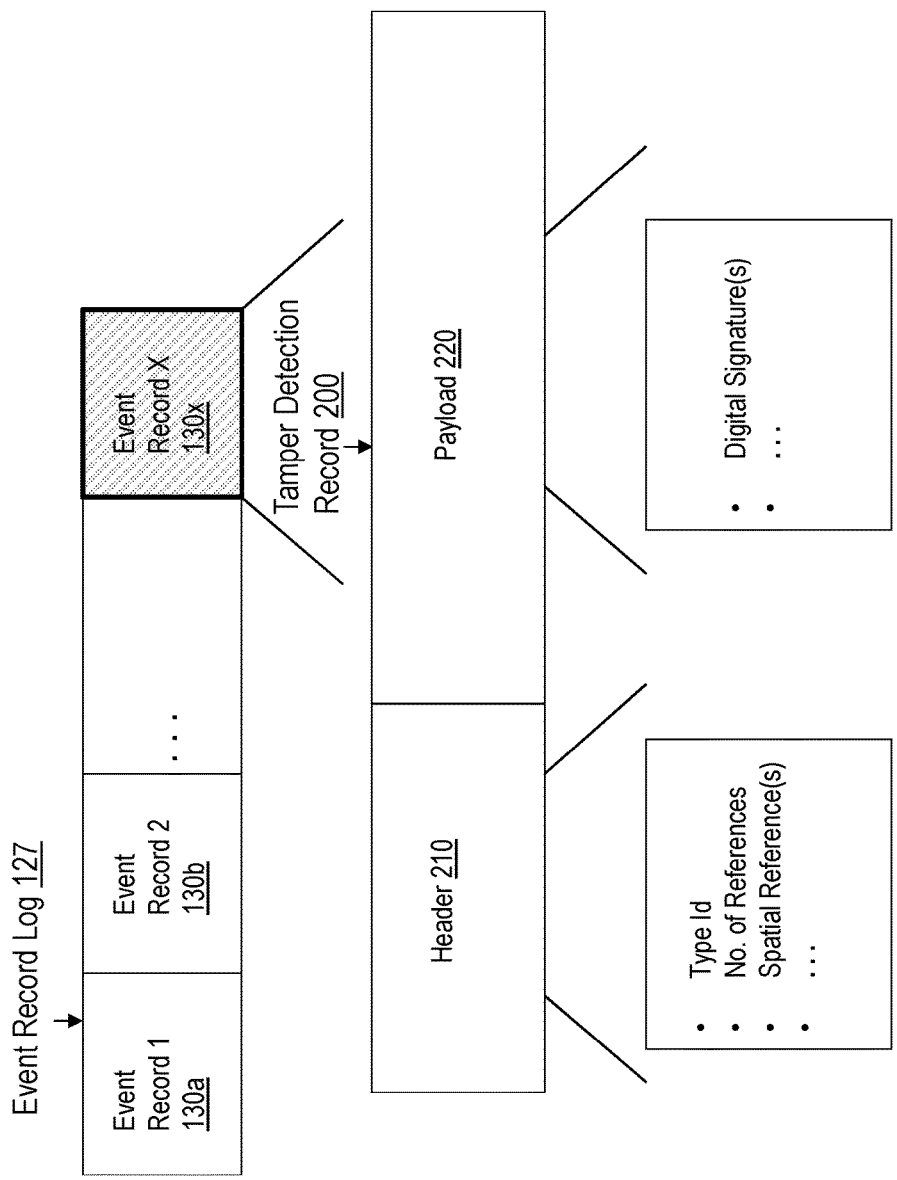
FIG. 2 illustrates an example event record log including a tamper detection record.

FIG. 2 illustrates an example event record log 127 including a tamper detection record 200. For example, the processor 110 may generate the event record 130a. In response, the operating system 122 may additionally generate a metadata that includes tamper detection information for the event record 130a. The operating system 122 may record, or format the tamper detection information as a separate event record 130x, referred to as the tamper detection record 200 in the present document. The operating system 122 may subsequently record the tamper detection record 200 in the event record log 127. Thus, the processor may insert a separate record in the event record log that contains the tamper detection information of the event record 130a. The tamper detection record 200 may use the same predetermined format of the event records.

For example, as shown in FIG. 2, the tamper detection record 200 includes a header 210 and a payload 220. The payload 220 includes a digital signature for the corresponding event record 130a. The digital signature demonstrates the authenticity of the corresponding event record 130a. In an example, the digital signature is encrypted such as using asymmetric cryptography or any other type of encryption techniques. For example, the digital signature may be based on contents of the event record 130a, a private key, a public key, a timestamp, or other information of the event associated with the event record 130a. In an example, the contents of the event record 130a may be hashed, such as using a hashing scheme prior to encryption. To validate the event record 130a, the operating system 122 may decrypt the digital signature in the payload 220 and compare it with the contents of the event record 130a. The header 210 may include metadata of the payload 220. For example, the header 210 may include a length of the payload 220 or a timestamp. In addition, the header 210 may include an identifier that indicates that the payload 220 contains tamper detection information unlike description of an event as is the case with a typical event record.

In an example, the operating system 122 may associate the tamper detection record 200 with a single event record, such as the event record 130a. For example, the header 210 may include a spatial reference of the event record 130a. The spatial reference may be a memory location of the event record 130a. Alternatively or in addition, the spatial reference may be spatial relation between the tamper detection record 200 and the corresponding event record 130a. For example, the spatial relation may be a predetermined relation based on the memory locations of the records. In such a case, the spatial reference of the first event record is implicitly identified based on the predetermined relation and the memory location of the second event record, thus, not avoiding explicitly saving a spatial reference in the tamper detection record.

Thus, the spatial reference is either explicitly stored or it can be implicit. If it is explicit, the location of the first event record 130a is stored in the tamper detection record 200. The location may be a location of the first event record in memory or in a file. When the spatial reference is implicit, it is with relation to the data in memory or a file. The system 100 may use a predetermined spatial relation between the first event record 130a and the tamper detection record 200. For example, according to the predetermined spatial relation, the first event record 130a may precede the tamper detection record 200 with no other records in between. Alternatively, the predetermined spatial relation permits other event records of that same type as the first event record 130a in between the first event record 130a and the tamper detection record 200. In an example, the other event records cannot be included in the tamper resistant data, which is the payload 200, of the tamper detection record 200.

In an example, the operating system 122 may associate the tamper detection record 200 with more than one event record in the event record log 127, such as with the event records 130a and 130b. Accordingly, the header 210 may include spatial references to each event record that is associated with the tamper detection record 200. Additionally, the header 210 may include a number of event records that the tamper detection record 200 is associated with and the length of each respective digital signature included in the payload 220. In an example, the operating system 122 may associate the tamper detection record 200 with a predetermined number of successive event records in the event log 127. For example, the tamper detection record 200 may be associated with 5 successive event records, or 10 successive event records, or any other predetermined number of event records. Alternatively or in addition, the number of event records associated with the tamper detection record 200 may be dynamically determined based on a number of event records stored in a predetermined memory range that the tamper detection record 200 is associated with. The spatial reference in the header 210 may identify the memory range that is associated with the tamper detection record 200.

In another example, the operating system 122 may associate the tamper detection record 200 with events of a selected type, such as file type events, user type events, or any other type of events. For example, consider that the tamper detection record 200 is associated with file type events. If the operating system 122 generates the event record 130a in response to a file type event, the operating system 122 may associate the event record 130a with the tamper detection record 200. The header 210 of the tamper detection record 200, in such a case, may indicate an identifier of the type of event records that are associated with the tamper detection record 200. In the above example, the header 210 may include an identifier of the file type event. The operating system 122 may associate each file type event record with the tamper detection record 200.

In yet another example, the operating system 122 may associate the tamper detection record 200 with a set of consecutive event records of the same type. The memory locations of the event records in the set of consecutive event records may precede the tamper detection record 200 or vice versa. For example, in response to detecting two or more consecutive events of the same type, the operating system 122 may generate and associate the tamper detection record 200 with the event records generated corresponding to the events. For example, the operating system 122 may generate a first event record 130a and a second event record 130b that are of the same type. In this case, the operating system 122 may generate the tamper detection record 200 that is associated with the first event record 130*a* and the second event record 130*b*. In other examples, the tamper detection record 200 may be associated with more than two event records of the same type.

Figure 3:
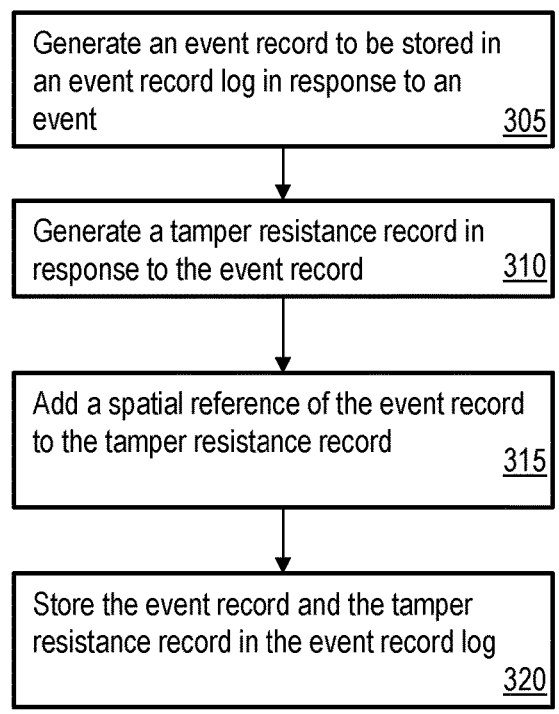
FIG. 3 illustrates logic of an example method of generating a tamper detection record.

FIG. 3 illustrates logic of an example method of generating a tamper detection record. The processor 110 implements the method. The method includes generating, by the processor 110, an event record in response to an event. (305). The processor detects occurrence of the event. For example, the processor may be configured to detect occurrence of a predetermined event type. In response to the occurrence of an event of the predetermined type, the processor 110 may generate the event record. The processor generates a second event record in response to generation of the event record. (310) The second event record is the tamper detection record 200 that includes the digital signature corresponding to the event record and a spatial reference of the event record. (315). The processor 110 stores the event record and the tamper detection record in the event record log 127. (320).

Figure 4:
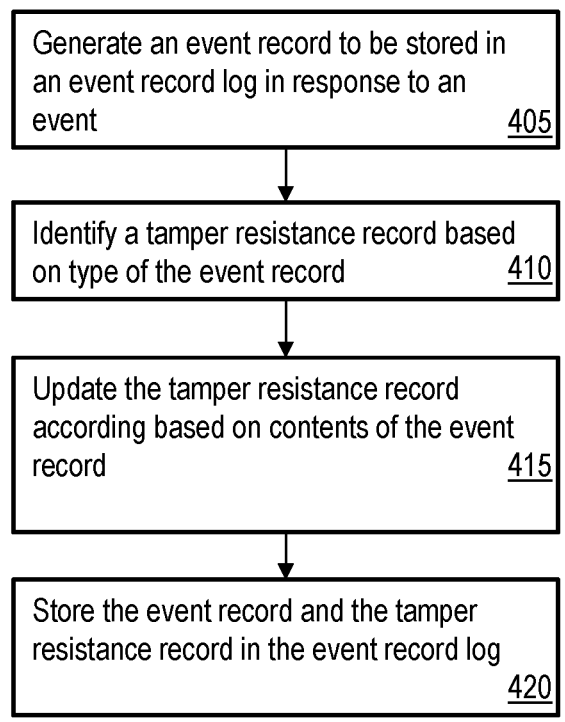
FIG. 4 illustrates logic of an example method of associating an event record with a tamper detection record.

FIG. 4 illustrates logic of an example method of associating an event record with a tamper detection record. The processor 110 implements the method. The method includes generating, by the processor 110, an event record in response to an event. (405). The processor identifies the tamper detection record 200 corresponding to the event record based on a type of the event record. (410). For example, if the event is a file type event, the processor 110 may identify a tamper detection record for the file type events from the event record log 127. The processor 110 updates the tamper detection record 200 to include the digital signature corresponding to the event record and a spatial reference of the event record. (415). The processor 110 stores the event record and the updated tamper detection record in the event record log 127. (420).

Figure 5:
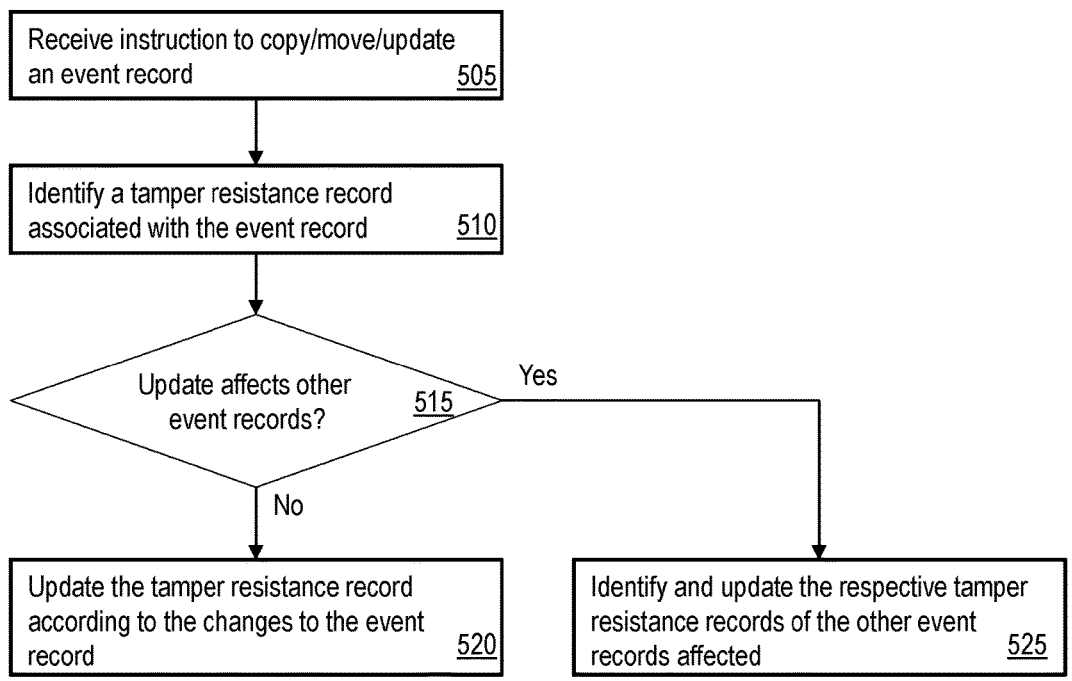
FIG. 5 illustrates logic of an example method of updating an event record.

FIG. 5 illustrates logic of an example method of updating an event record. The processor 110 implements the method. The processor may receive an instruction to update an event record, such as the event record 130*a*. (505). The instruction may be an instruction to copy the event record 130*a*, move the event record 130*a*, modify contents of the event record 130*a*, or any other such instruction. The processor, in response, identifies the tamper detection record 200 that is associated with the event record 130*a*. (510). For example, in case that the system 100 associates the tamper detection record 200 with event records in a predetermined memory range, the processor 110 identifies the tamper detection record 200 based on the memory location of the event record 130*a*. Alternatively or in addition, the processor may identify the tamper detection record 200 based on the type of the event corresponding to the event record 130*a*.

Once the processor identifies the corresponding tamper detection record 200, the processor 110 determines if updating the tamper detection record 200 affects other event records. (515). If not, the processor updates the tamper detection record 200 according to the changes to the event record 130*a*. (520). For example, in case the instruction is to copy or move the event record 130*a*, the processor 110 copies or moves the tamper detection record 200 in conjunction with the event record 130*a*. Additionally or alternatively, the processor 110 may revise the copied tamper detection record to update the spatial reference of the event record 130*a*.

In another example, updating the tamper detection record 200 may affect other event records in the event record log 127. In this case, the processor 110 identifies and updates the respective tamper resistance records of the other event records affected. (525). For example, consider that the processor 110 is to maintain the spatial relation between the event record 130*a* and the corresponding tamper detection record 200. Assume that the event records in FIG. 2 are located in the memory in the sequence as depicted. In this case, as shown in FIG. 2, other events records, such as event record 130*b*, may be located between the event record 130*a* and the tamper detection record 200 (event record 130*x*). For example, the processor 110, in response to the request to copy the first event record 130*a*, makes a copy of the first event record 130*a* and a copy of the tamper detection record 200. Subsequently, the processor 110 stores the copy of the tamper detection record 200 at the same spatial distance from the copy of the first event record as the spatial distance between the first event record and the second event record. In an example, to maintain the spatial relation, the processor 110 copies the event record 130*a*, the tamper detection record 200, and the intermediate event records, such as the event record 130*b*, in response to the instruction. Thus, the event records, other than the event record 130*a* and the corresponding tamper detection record 200 are affected.

In another example, the tamper detection record 200 may correspond to multiple event records. For example, the tamper detection record 200 may be associated with multiple event records of the same type of events. In this case, the processor 110 may update the spatial reference of the event record 130*a* in the tamper detection record 200 upon completion of the instruction. Alternatively, the tamper detection record 200 may be associated with multiple event records in a memory range. Upon completion of the instruction, the event record 130*a* may or may not remain in the memory range. If it remains in the memory range, the processor 110 updates the spatial reference of the event record 130*a* in the tamper detection record 200 upon completion of the instruction. If not, processor 110 removes the spatial reference of the event record 130*a* from the tamper detection record 200 upon completion of the instruction. Additionally, the processor 110 updates a second tamper detection record upon completion of the instruction based on a new memory location of the event record 130*a*.

The above examples are a few possible scenarios. Other examples are possible.

The processor may identify whether the event record is a tamper detection record or a typical event record based on an identifier in the header 210 of the event record. The processor 110 may bypass, or ignore the tamper detection record 200, such as unless the processor 110 is performing a regulatory compliance audit of the event record log 127. During the audit, the processor 110 identifies the tamper detection record 200 for each respective event record that is to be analyzed. The processor 110 determines if the contents of the event record have been modified, or have been tampered with, by comparing the contents of the event record with the digital signature in the payload 220 of the tamper detection record 200. If the validity of the contents of the event record is not confirmed based on the comparison, the processor flags the event record in an audit report or in any other manner, such as by displaying an error, an audible note, or any other user notification. Alternatively, if the comparison confirms the validates the event record as being tamper free, the processor 110 continues to analyze the next event record and complete the audit report.

In the examples described throughout the present document, the processor 110 may associate the tamper detection record 200 with the corresponding event record, without modifying the event record. Since, the event record continues to use the predetermined event record format, any existing infrastructure and/or applications to read and analyze the event record log may continue to operate without any changes. Accordingly, tamper detection for regulatory compliance may be added to the existing infrastructure in an efficient manner, without incurring costs to modify existing processes.

Thus, the problem solved by the examples described throughout this application is the ability to insert tamper detection in an existing event logging system while preserving existing workflows and software that uses the existing log data. The examples facilitate transporting digital signature in the log data as additional logged data without modifying the data provided using existing log APIs. Accordingly, tamper detection metadata may be integrated directly into existing record log by providing tamper detection metadata in the same format as other logged event records. This provides ease of use for compatibility with existing tooling as well as portability when moving logged event records. The tamper detection information is transparently carried along with the logged event records. By using the technical solutions described throughout the present application, a logging platform may include tamper detection data without impacting the core-functionality of the original platform.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The examples in the present document have been presented for purposes of illustration and description, and not intended to be exhaustive or limited to those in the form disclosed. Many modifications and variations will be apparent to those of ordinary skill in the art without departing from the scope and spirit of the present document. The examples were chosen and described in order to best explain the principles of the technical solutions and the practical application, and to enable others of ordinary skill in the art to understand the various examples with various modifications as are suited to the particular use contemplated.

The technical solutions may be implemented as a system, a method, and/or a computer program product. The computer program product may include a computer readable storage medium (or media) having computer readable program instructions thereon for causing a processor to carry out aspects of the technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the technical solutions may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described throughout the present application.

Aspects of the present application are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples described throughout the present document. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples in the present document have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the examples disclosed herein.

What is claimed is:

1. A computer implemented method, comprising:
   securing, by a processor, a log of one or more events being performed a computer by adding tamper detection to the log, the securing comprising:
   generating, by the processor, a first event record in response to an event being performed by the computer;
   identifying, by the processor, a tamper resistance record in the log, the tamper resistance record corresponding to a type of the first event record;
   updating the tamper resistance record by adding at least:
   a signature corresponding to the first event record; and
   a spatial reference of the first event record, the spatial reference identifying a memory location of the first event record; and
   in response to a request to detect tampering of the first event record, validating the first event record based on the signature in the tamper resistance record.

2. The computer implemented method of claim 1, wherein the signature identifies contents of the first event record.

3. The computer implemented method of claim 2, wherein the tamper resistance record further comprises an identifier of the type of the first event record.

4. The computer implemented method of claim 2, further comprising:
   receiving, by the processor, a request to copy the first event record; and
   copying, by the processor, the first event record and the tamper resistance record, which includes the spatial reference of the first event record, in response to the request to copy the first event record.

5. The computer implemented method of claim 1, further comprising:
   receiving, by the processor, a request to copy the first event record;
   making, by the processor, a copy of the first event record and a copy of the tamper resistance record in response; and
   storing, by the processor, the copy of the tamper resistance record at the same spatial distance from the copy of the first event record as a spatial distance between the first event record and the tamper resistance record.

6. The computer implemented method of claim 1, further comprising:
   receiving, by the processor, a request to copy event records of the type of the first event record; and
   copying, by the processor, the first event record, and the tamper resistance record in response.

7. The computer implemented method of claim 2, further comprising:
   receiving, by the processor, a request to detect tampering of the first event record; and
   in response to the request, validating, by the processor, the first event record by comparing the contents the first event record with the signature in the tamper resistance record.

8. A system, comprising:
   a memory; and
   a processor; wherein the processor is operable to secure a log of one or more events being performed by a computer by adding tamper detection to the log, wherein the processor, for the securing, is configured to:
   generate a first event record corresponding to an event performed by the system;
   generate a tamper detection data for the first event record;
   identify a tamper resistance record for a type of the first event record, from a plurality of tamper resistance records in the log;
   store the tamper detection data of the first event record in the tamper resistance record, wherein the tamper detection data comprises: a spatial reference of the first event record, the spatial reference identifying a memory location of the first event record; and in response to a request to detect tampering of the first event record, validate the first event record based on the tamper detection data in the tamper resistance record.

9. The system of claim 8, wherein the processor is further configured to:
receive an instruction to copy the first event record; and
in response, copy the first event record and the tamper resistance record.

10. The system of claim 8, wherein the processor is further configured to:
receive an instruction to move the first event record; and
in response, bypass the tamper resistance record.

11. The system of claim 8, wherein the processor is further configured to:
receive an instruction to move the first event record; and
in response, maintain a spatial relation between the first event record and the tamper resistance record by moving the tamper resistance record in conjunction with the first event record.

12. The system of claim 8, wherein the processor is further configured to:
receive an instruction to copy event records of the type of the first event record; and
in response, identify and copy the event records of the type of the first event record, and identify and copy the tamper resistance record that is associated with the type of the first event record;
generate a third event record corresponding to another event performed by the system, wherein the third event record is of a second type, different from the type of the first event record; and
generate a second tamper detection data for the third event record, and store the second tamper detection data in a second tamper resistance record corresponding to the second type.

13. The system of claim 8, wherein the first event record and the tamper resistance record use a common event record format.

14. A computer program product comprising a non-transitory computer readable storage medium having program instructions embodied therewith, the program instructions being executable by a processor to cause the processor to perform a method comprising:
securing a log of one or more events being performed a computer by adding tamper detection to the log, the securing comprising:
generating a metadata for a first event record, wherein the metadata comprises a signature of the first event record;
identifying, from a plurality of tamper resistance records in the log, a tamper resistance record for a type of the first event record;
storing the metadata in the tamper resistance record, wherein the metadata comprises: a signature corresponding to the first event record; and a spatial reference of the first event record, the spatial reference identifying a memory location of the first event record; and
in response to a request to detect tampering of the first event record, validating the first event record based on the signature in the tamper resistance record.

15. The computer program product of claim 14, wherein the metadata is based on a type of a system event corresponding to the first event record, and the metadata comprises an identification of the type of the system event.

16. The computer program product of claim 15, wherein the tamper resistance record comprises a plurality of metadata for a plurality of event records corresponding to respective system events of the same type as the type of the system event of the first event record.

17. The computer program product of claim 14, wherein the program instructions are executable by the processor to cause the processor to perform the method that further comprises:
receiving an instruction to move the first event record; and
in response, moving the tamper resistance record.

18. The computer program product of claim 14, wherein the tamper resistance record further comprises an identifier of the type of the first event record.

19. The computer program product of claim 14, wherein the method further comprises:
receiving an instruction to move the first event record; and
in response, maintaining a spatial relation between the first event record and the tamper resistance record by moving the tamper resistance record in conjunction with the first event record.

20. The computer program product of claim 16, wherein the method further comprises:
receiving a request to copy event records of the type of the first event record; and
in response, copying the tamper resistance record and a plurality of event records corresponding to the plurality of metadata in the tamper resistance record.

* * * * *